United States Patent [19]
Rao et al.

[11] Patent Number: 5,375,118
[45] Date of Patent: Dec. 20, 1994

[54] APPARATUS FOR TRANSMITTING DATA BETWEEN TWO PARTIES BELONGING TO AT LEAST ONE NARROW BAND INTEGRATED SERVICES DIGITAL NETWORK

[75] Inventors: Sathyanarayana Rao, Bern; Eberhard Schwerdtel, Hinterkappelen, both of Switzerland

[73] Assignee: Ascom Tech AG, Bern, Switzerland

[21] Appl. No.: 108,056

[22] Filed: Aug. 17, 1993

[30] Foreign Application Priority Data

Aug. 21, 1992 [CH] Switzerland .................. 02603/92

[51] Int. Cl.$^5$ .................. H04L 12/48; H04L 12/66
[52] U.S. Cl. .................. 370/60.1; 370/79; 370/94.1; 370/110.1
[58] Field of Search .................. 370/60, 60.1, 85.13, 370/94.1, 94.2, 110.1, 58.1, 79, 99

[56] References Cited
U.S. PATENT DOCUMENTS

| | | | |
|---|---|---|---|
| 5,214,642 | 5/1993 | Kunimoto et al. | 370/94.1 X |
| 5,220,562 | 6/1993 | Takada et al. | 370/94.1 X |
| 5,220,563 | 6/1993 | Grenot et al. | 370/94.1 |
| 5,280,476 | 1/1994 | Kojima et al. | 370/60.1 |

Primary Examiner—Melvin Marcelo
Attorney, Agent, or Firm—McAulay Fisher Nissen Goldberg & Kiel

[57] ABSTRACT

For transmitting digital data between any parties of an N-ISDN network, the latter is interlinked with an ATM network. Two network adaptors are connected in each case with one node of each of the networks over incoming and outgoing lines of the respective network norm. The network adaptors are constructed on the side of the N-ISDN network for receiving and sending out time-multiplexed octets and, on the side of the ATM network, for receiving and sending out cells, which serve as addressed carriers for octets and have the same destination direction. The network adaptors operate free of blockages and losses.

4 Claims, 2 Drawing Sheets

APPARATUS FOR TRANSMITTING DATA BETWEEN TWO PARTIES BELONGING TO AT LEAST ONE NARROW BAND INTEGRATED SERVICES DIGITAL NETWORK

BACKGROUND OF THE INVENTION a) Field of the Invention

The invention relates to an apparatus for transmitting digital data between any first party and a second party assigned to this first party, wherein the parties belong to a single, common or to two mutually independent narrowband integrated services digital networks (N-ISDN networks).

b) Background of the Related Art

The N-ISDN network (Narrowband Integrated Services Digital Network), referred to above is understood to be a digital telecommunication network, which integrates various duties and for which the transmission up to the users, that is, up to the end use equipment, such as telephone equipment, is accomplished digitally. The bit rate of a channel is 64 kbit/s, which corresponds to the PCM standard (Pulse Code Modulation) (scanning values of, in each case, 8 bits (octet) in the repetition cycle of 8 kHz). There exists extensive standards documentation and literature dealing with ISDN technology.

Digital transmission, differently organized and with a band broader by several orders of magnitude, is being provided at the present time through the ATM Networks (Asynchronous Transfer Mode). These networks are actual transport networks, on which addressed cells operate synchronously, it being possible for the parties to insert these cells into the network or to take them out at any time in an asynchronous manner. A cell consists of a header of 5 octets (40 bit) and a payload of 48 octets for transporting useful information. There also exists standards information and literature concerning ATM networks.

It is now desirable and advantageous and is a general object of the invention that said networks can be interlinked with one another. This means that it must be possible to indicate network adaptors, with the help of which it is possible to bring useful information from the one network into the other and the reverse. From this, there results a particular object of the present invention, that is, to provide such a network adaptor, which is simple in construction and with the help of which good utilization of the transmission capacities of the two networks is possible.

In accordance with the present invention, an apparatus for transmitting digital data between any first party and a second party assigned to the first party, the parties belonging to a single, common or two mutually independent N-ISDN networks comprises that the N-ISDN network or networks altogether have at least two ISDN nodes, an ATM network having at least two ATM nodes and at least two network adaptors. The two network adaptors have at least one ISDN node and at least one ATM node connected to them over incoming and outgoing lines of a respectively assigned network norm. The network adaptors are constructed free of blockages for receiving time-multiplexed octets from the lines coming in from the respective N-ISDN network or sending out time multiplexed octets on the lines going out to the respective N-ISDN network. The network adaptors are also for sending out and receiving cells on the lines going out to the ATM network and from the lines coming in from the ATM network respectively. The cells, as carriers of octets of an N-ISDN network, are specially marked. Finally, the network adaptor also function to empty the octets from the payloads of incoming cells.

For a better understanding of the present invention, reference is made to the following description and accompanying drawings while the scope of the invention will be pointed out in the appended claims.

DETAILED DESCRIPTION OF THE PREFERRED EMBODIMENT

Figure 1:
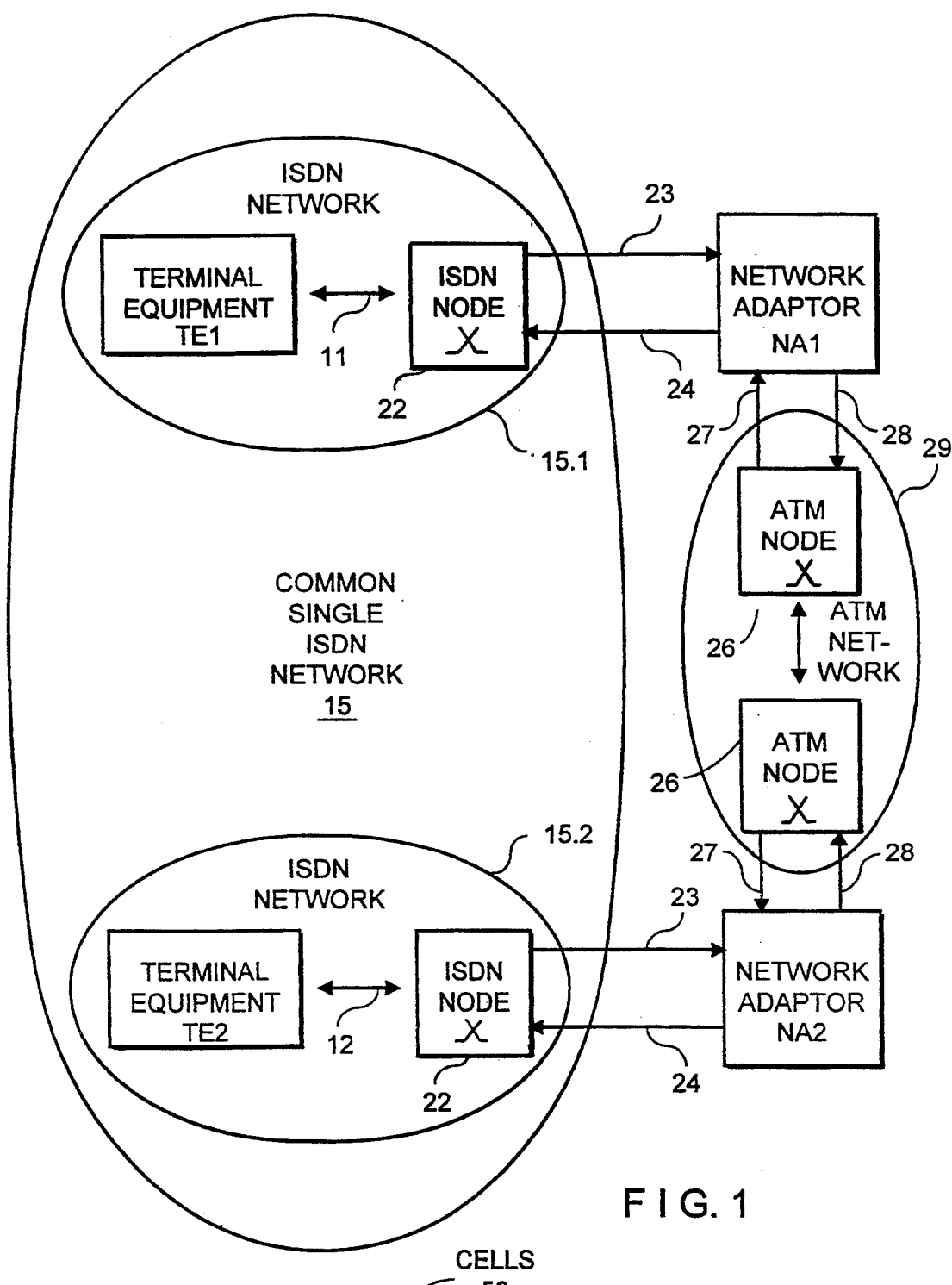
FIG. 1 shows the basic structure of interlinked N-ISDN and ATM networks.

FIG. 1 shows the basic structure of two different, mutually interlinked, digitally operating networks for connecting two parties TE1 and TE2 (terminal equipment) for the purpose of exchanging data. The digital parties TE1, TE2 are connected over digital party lines 11, 12 with two N-ISDN networks 15.1, 15.2, which can be either separate networks, such as spatially separate networks, or partial regions of a common, single N-ISDN network 15. The networks 15 are connected over the network adaptors NA1, NA2 with an ATM network 18. These network adaptors enable the useful information generated by one party (such as TE1) to be delivered from network to network (15.1, 18, 15.2) up to the receiving, second party TE2.

Every N-ISDN network 15.1, 15.2 comprises at least one ISDN node 22, which is generally connected with corresponding other nodes 22 of this network, which are not shown. Altogether, at least two ISDN nodes 22 are required. Furthermore, the plurality of party lines, which go out from each ISDN node 22, is not shown. Likewise, the ATM net network 18 has at least two ATM nodes 26.

The network adaptors NA1, NA2 are each connected by an incoming line 23 or 27 and an outgoing line 24 or 28 of the respective network norm and of any length with, in each case, one node 22 or 26 of the two networks 15 and 18. The parties TE1, TE2, as end use equipment of the two ISDN networks 15.1, 15.2, form sources or sinks for the exchange or the transmission of digital data in, for example, both directions. These data are organized in the form of the PCM standard as time-multiplexed octets (blocks of 8 bits). At a repetition cycle of 8 kHz, these octets of one source together form, as already stated, a transmission channel of 64 kbit/s or the transmitted useful information.

In the N-ISDN networks 15.1, 15.2, the nodes 22 are connected with one another according to the PCM technology, that is, by lines on which time-multiplexed 30(+2) octets of predominantly different origin flow in the cycle of 125 µs. This corresponds to 30(+2) 64 kbit/s channels. Related to the individual octets, this means that these are transmitted on said lines in time-multiplexed fashion, that is, in time-position-coded fashion, with each octet in a well-defined, identifiable time slot.

Figure 2:
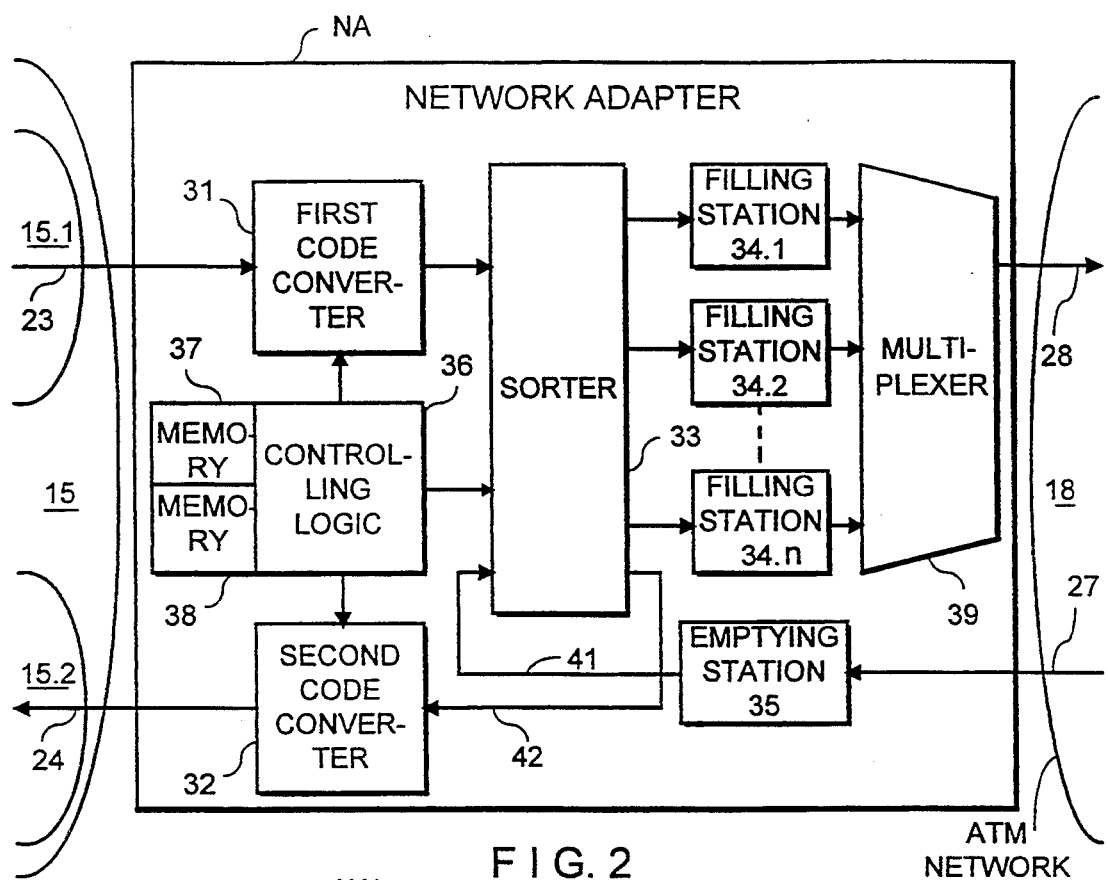
FIG. 2 shows a block circuit diagram of a first network adaptor for connecting an ISDN network and an ATM network.

FIG. 2 shows the block circuit diagram of a first network adaptor NA. This unit comprises two code converters 31, 32, a sorter 33, several filling stations 34.1–34.n, a multiplexer 39, an emptying station 35 and a controlling logic 36, to which at least two memories 37, 38 are assigned.

The one (first) code converter 31 lies between the line 23, coming in from the ISDN network 15.1, and the sorter 33 and serves for providing the octets, coming in time-multiplexed or time-position-coded and, with that, serially from the ISDN node 22, with destination addresses. The information necessary for this is supplied by the logic 36 together with the memory 37, with the objective of indicating in which other network adaptor NA which time slot of the line 24, outgoing there to the N-ISDN network 15.2, is to be engaged with the respective octet.

The other (second) code converter 32 is inversely oriented and constructed and converts incoming, destination-coded octets into position-coded octets, that is, it sorts the octets into the respectively assigned time slots of the outgoing line 24. This process is also controlled by the logic 36 and the contents of the memory 37.

Memory 37 contains the information, which is constantly required for recoding the octets in the code converters 31, 32, that is, information concerning the destination addresses to be added or concerning the time slots of the outgoing line 24, assigned to the destination addresses. This information is subject to constant change, as the communications connections are changed. It is generated in each case by a selective process during the formation of a connection between the parties TN1, TN2 and is stored, up to the end of this connection, in the memory 37 of the two participating network adaptors NA1 and NA2. The process of information formation, as such, is not an object of the invention described here. It is, however, clear that the memory 37 must be a genuine random access memory, the contents of which are constantly changing.

The other memory 38 contains long-term, hardly changing information concerning the lines in the total ATM network 18, that is, routing information concerning the most advantageous connections between the network adaptors NA in question. The objectives in the ATM network 18 are referred to in the following also as destinations. With the assistance of the routing information, the most advantageous connection paths to the required destinations are indicated to the sorter 33.

The sorter 33 has the task of supplying the target-coded octets, coming in from the first code converter 31 or the emptying station 35, individually, to one of the filling stations 34.1–34.n connected in parallel with it. For this purpose, the sorter reads the destination address of the octet, determines from this and with the help of the said routing information the most suitable filling stations 34.1–34.n and subsequently reads the respective octet into this respective, selected filling station. If the destination address of an octet indicates the immediately considered network adaptor NA as the proper destination and not some other destination, the octet is routed instead over line 42 to the second code converter 32. In this manner, the octet has arrived at the end of its path through the ATM network 18.

Figure 3:
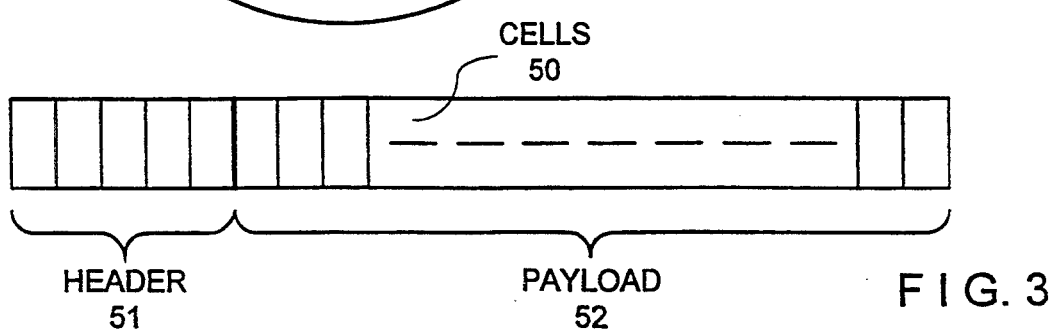
FIG. 3 shows the basic structure of a cell of the ATM network.

All filling stations 34.1–34.n are constructed in the same manner and serve for constantly, repeatedly assembling one of the cells of the ATM network 18. In this connection, FIG. 3 shows the known construction of such a cell 50. This comprises a header 51 of, for example, five octets in length and a payload 52, of eighty-four octets in length. The filling stations 34.1–34.n are so arranged, in that the octets together with their destination addresses, coming in from the sorter 33, in each case, flow serially into the payload 52 of a prepared cell 50, which is to be filled with useful information. If the respective cell 50 is finished completely and the payload 52 if filled, then this cell 50 is routed over the multiplexer 39 and the outgoing line 28 to the ATM node 26 and, with that, to the ATM network 18. In this connection, it is important that the cell is labeled in its header 51 as a cell with ISDN octets or as an NA cell (cell coming from a network adaptor NA). Furthermore, the destination of the cell must correspond exactly or at least approximately to the destinations of the destination-coded octets contained in it. On the other hand, where the octets come from, what their sources are or which party TE has sent them out does not play a role. In general, a plurality of octets of completely different parties TE is contained therewith in the payload 52 of a cell 50, no special sequence or order being necessary.

The emptying station 35 is arranged between the line 27, coming in from the ATM network 18, and the sorter 33. It is constructed so that the cells 50, coming in from the ATM network 18, are deleted and the contents of the respective payload 52, that is, the destination-coded octets, are routed serially to the sorter 33 over the line 41.

The previously described network adaptor NA works in the following way. The octets sent out every 125 $\mu$s by a party, such as TE1, pass through the N-ISDN network 15.1 and, time multiplexed, reach the ISDN node 22, which is assigned to the network adaptor NA1. This node 22 routes the octet free of deadlocks and delay and time multiplexed over line 23 to the first code converter 31. Because of the preceding selection processes (trunking scheme), the code converter 31 and the logic 36 know with which destination addresses the incoming octets are to be provided in each case. They supplement each octet with its assigned address information and route the address-coded octets, so formed, on to the sorter 33. The sorter reads the address information of each octet and selects the most suitable destination for this information. The network information required for this is taken by the sorter from the memory 38. Subsequently, the sorter routes the respective octet to the respective, selected, assigned filling station 34.1 to 34.n. The destination-coded octets arrive in this manner in these filling stations, arranged in parallel in the payload 52 of the respective waiting cells 50 for the selected destinations. As soon as a cell 50 fulfills the criterion for its start, the filling process is terminated and the cells flow over the multiplexer 39 and the outgoing line 26 into the ATM node 26 of the ATM network 18. This node 26 now routes the respective cell 50 through the ATM network 18 in the direction of the destination given in its header 51. As soon as this destination is reached, that is, as soon as the network adaptor NA2 in the given example is reached, the cell, over the incoming line 27, reaches the emptying station 35. This emptying station now liquidates the incoming cell 50 and routes all destination coded octets, contained therein, to the sorter 33.

The sorter 33 now sorts these octets in the manner already described and once again fills further cells 50 with them, if the ATM network 18 must be used once again to reach the respective destination. On the other hand, if this is not the case because the destination of the network adaptor NA2 was reached, these respective, destination-coded octets are routed over line 42 to the second code converter 32. This converter 32 reads the respective destination address and inserts each octet into the respective, correct time slot of the line 24 going out to the N-ISDN network 15.2. Over this line 24, the now position-coded or time-multiplexed octets reach the assigned ISDN node 22, which routes them further through the N-ISDN network 15.2 to the desired party TE2.

In the manner described, the N-ISDN network or networks 15, 15.1, 15.2 can cooperate optimally as relatively locally limited or as regional networks and the ATM network 18 as remote network or supraregional network. Each of the networks 15 or 18 falls completely under its own norm and requires no adaptation whatsoever. In particular, the large transport capacity for useful information, which the cells 50 have, can be utilized optimally. The various networks 15, 18 supplement one another in the best manner in this way. The network adaptors NA are simple in construction and clearly arranged. They can therefore be produced relatively inexpensively and varied easily depending on the particular requirements, for example, with respect to size.

Figure 4:
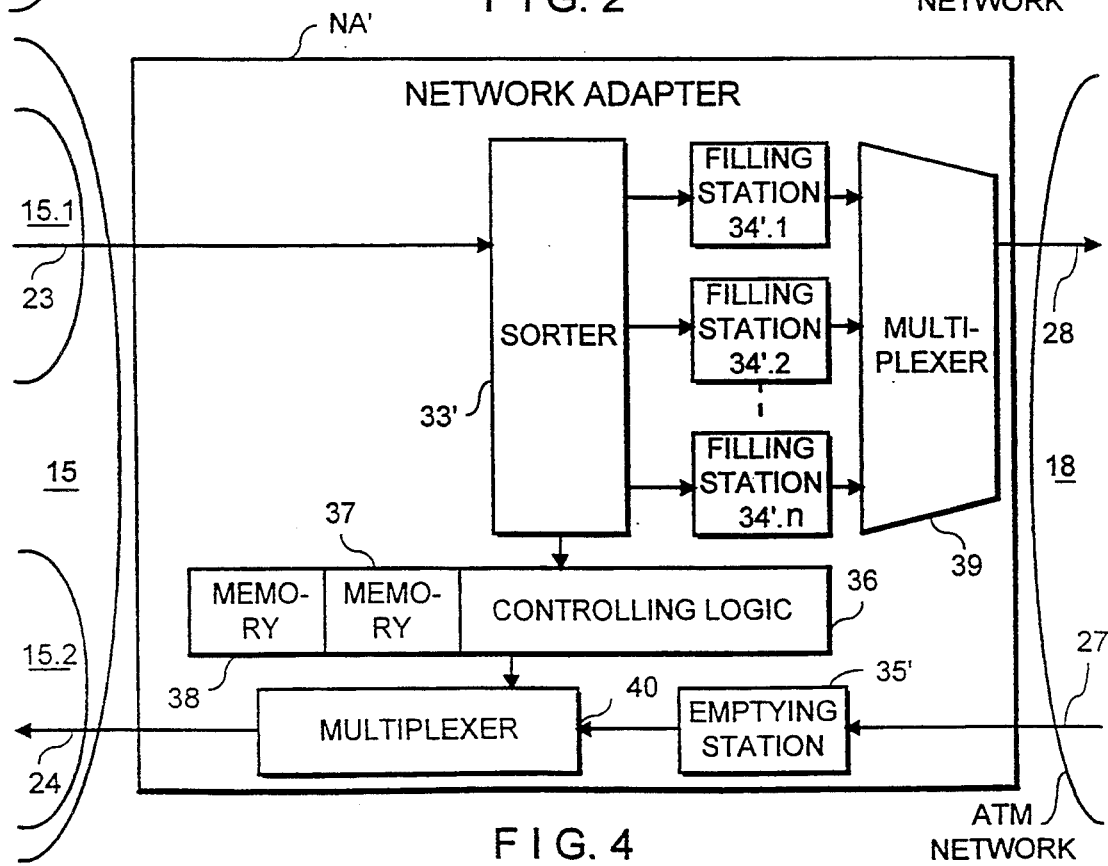
FIG. 4 shows a block circuit diagram of a second network adaptor.

FIG. 4 shows the block circuit diagram of a further, second network adaptor NA'. This comprises a sorter 33', several filling stations 34'.1–34'.n connected in series with the sorter 33', a multiplexer 39, an emptying station 35', a multiplexer unit 40 and a logic 36 with assigned memories 37, 38.

The sorter 33' is connected to the line 23 coming in from the N-ISDN network 15. It demultiplexes the octets coming in over this line 23 and sorts these into the filling stations 34'.1–34'.n that are connected in series. This sorting takes place so that a precisely defined position order results in the payload 52 of the cells 50 that are to be filled. This order forms a static multiplex, which is dissolved once again in the emptying station 35'.

The cells 50, filled in the filling stations 34'.1–34'.2, carry in their header 51 destination information, which corresponds to the destination directions of the octets contained in them. The cells 50 are furthermore characterized as "cells with ISDN octets" or as cells sent out from a network adaptor and are referred to in an abbreviated fashion as NA cells.

The multiplex unit 40, connected in series with the emptying station 35', multiplexes the octets arriving in an ordered fashion from the emptying station 35' in accordance with the multiplex in the payload 52 of the cells 50 on the line 28 going out to the ATM network 18. In its function, the multiplex unit 40 thus corresponds to a well-known "time interchange circuit" of a PCM network. The logic 36 finally controls the described units 33', 34', 35', 40, the necessary information being contained in the memories 37, 38.

The second network adaptor NA' works in a manner similar to the first network adaptor described in of FIG. 2. The incoming octets, time multiplexed over the line 23 from the N-ISDN network 15.1, are passed on by the sorter 33' in accordance with their respective destination directions to the various filling stations 34'.1–34'.n. These filling stations read the octets in the payload 52 of a cell 50, which is in the process of being built up, a specified, precise order with respect to the positions or places to be occupied being maintained in the sense of a multiplex. The finished cells 50 flow over the multiplexer 39 and the outgoing line 28 into the ATM network 18.

The cells 50, coming in over line 27 from the ATM network 18, reach the emptying station 35'. The octets, contained in the payload 52, are read out taking into account their places and routed to the multiplex unit 40. This unit time multiplexes the octets into the time slots of the line 24 going out to the N-ISDN network 15. All these processes are controlled by the logic 36.

In the case of the first network adaptor NA corresponding to FIG. 2 as well as in the case of the second network adaptor NA' corresponding to FIG. 4, the payload 52 of the cells 50 used is generally filled with a plurality of octets, which generally originate from different sources or parties TE. In the case of the first network adaptor NA, an address is added in each case to the octet. Because of this address, it is possible to do without any special order of the octets in the ATM network 18. In the case of the second network adaptor NA', on the other hand, the destination information of the octet is in the position selection within the payload 52 of the cells 50, for which reason a precisely specified positioning must be maintained in the cells 50 and when reading out from these.

The information, required by the first network adaptor NA and stored in the memory 37, consists essentially of a list of the time slots of the incoming multiplex line 23, an address being assigned to each time slot, provided that the time slot is not empty and does not contain a useful-information-octet. The information for the reverse direction consists of a further list of the time slots of the outgoing multiplex line 24, to which time slots addresses are assigned in an analogous manner. Because of the addresses of the octets, the latter can be reloaded without problems in the ATM network 18 from one cell 50 into a different cell 50, which other cells see to the further transport of the octet after the first cell has reached its destination. This can be regarded as a "change-over" from cell to cell and makes the transport of the octet in the ATM network 18 very flexible, since the necessary information for controlling the process is contained in the destination code of the octet (and does not have to be stored anywhere else).

The information for the orderly filling of the cells 50, required by the second network adaptor NA', consists essentially also of a list of the time slots of the incoming multiplex line 23. However, a special place in the payload 52 of a particular cell 50 is assigned to each time slot. Since the time slots of the multiplex line 23 repeat themselves in a 125 $\mu$s cycle, the cells 50 must change correspondingly, preferably in the same cycle. The information for the direction from the ATM network 18 to the N-ISDN network 15.2 consists analogously of a list of the time slots of the outgoing multiplex line 24, the allocation between the respective place in the payload of a particular, incoming cell 50 and said time slots being given.

In the case of an arrangement corresponding to FIG. 4, the transport of the octets contained in the cells 50 "in the static multiplex" requires only the capacity for transmitting pure octets, since explicit addresses do not have to be transmitted as well. This is an advantage over the arrangement of FIG. 2, for which the respective address or destination code of the octet must be explicitly transmitted as well. On the other hand, it is to be regarded as a disadvantage that synchronization between the time multiplex of the lines 23 and 24 and the outgoing and incoming cells 50 is required. A "change-over" of octets from cell to cell in the ATM network 18 requires in this case corresponding information at the respective change-over node 26.

In the following, a series of further variations is listed:

The logic 36 and the assigned control program can be configured in any way. The memory 37 for the respective connecting information must be a random access memory (RAM). The memory 38 for the routing or network information, on the other hand, can be designed strictly as a read only memory (ROM), if the configuration of the ATM network 18 changes only infrequently.

The sorters 33 and 33' can be designed either as serially operating units, as units operating in parallel or as mixed units, which operate serially and in parallel. Furthermore, the sorters independently contain a logic or—as described—work together with the general logic 36. Furthermore, they can be constructed as single-step or multi-step sorters and contain buffer memories of greater of smaller size, in order to satisfy the varying input load free of blockages and/or losses.

Instead of being linked over the multiplexer 39 and a single line 28 with the ATM network 18, the outputs of the filling stations 34.1-34.n or 34'.1-34'.n can also be linked over individually assigned lines leading to this network.

It is furthermore possible to realize the code converters 31, 32, the multiplexer 39 and the emptying station 35 several times and, instead of the single lines 23, 24, 27, 28, provide several such lines, which are connected either to a single or also to different nodes 22 and 26 of the networks 15 and 18.

As destinations for the network adaptor cells 50 in the ATM network 18, on the one hand, exclusively all other network adaptors NA can be permitted. This is conceptionally simple but does require, for a large ATM network 18, a correspondingly large number of filling stations 34, 34' per network adaptor. Secondly, all those ATM nodes 26, which are connected directly with the respective node 26, can be allowed as destinations. In this case, a renewed compiling of cells 50 must take place from ATM nodes to ATM nodes. Thirdly, however, basically any selectable ATM node can be taken up in the list of the respective destinations; this eliminates or reduces appreciably the aforementioned, constantly renewed compiling of NA cells 50.

The criteria for when a cell 50 is ready to be sent out can be selected almost at will for the network adaptors NA corresponding to FIG. 2. On the other hand, for the network adaptors NA' corresponding to FIG. 4, the sending out must be synchronized with the cycle of lines 23, 24.

Because of different, possible paths in the ATM network 18 and due to sorting delays, the sequence of destination coded octets, which belong together and is given in the first code converter 31, need not necessarily be maintained during the transmission. It can therefore be advantageous to assign a running number to each octet. The second code converter 32 can then be constructed to restore the original order, in that it buffers the octets and places them in order in accordance with their running number.

It should finally still be mentioned that, in addition to the described interlinking between, for example, two separate N-ISDN networks 15.1, 15.2 and one ATM network 18, other interlinkings over a further ATM network are also, of course, possible.

While the foregoing description and drawings represent the preferred embodiments of the present invention, it will be obvious to those skilled in the art that various changes and modifications may be made therein without departing from the true spirit and scope of the present invention.

What is claimed is:

1. An apparatus for transmitting digital data between any first party and a second party assigned to the first party, the parties belonging to a single, common or to two mutually independent N-ISDN networks, comprising:

said N-ISDN network or networks altogether having at least two ISDN nodes;

an ATM network having at least two ATM nodes;

at least two network adaptors, to which at least one ISDN node and at least one ATM node are connected over incoming and outgoing lines of a respectively assigned network norm;

wherein each network adaptor includes a first code converter connected to a line coming in from the ISDN network for converting each time-multiplexed, incoming octet into an unambiguously allocated, destination-coded octet;

a sorter, which is connected in series with the first code converter, for putting out each destination-coded octet on one of several outputs, which outputs correspond in each case to a destination allocated to the destination code of the respective octet;

filling stations, which are individually connected in series to the outputs of the sorter for filling sorted, destination-coded octets into the payload of the respective cells, which are to be provided and are intended for the particular destination, which corresponds to the respective output of the sorter;

an emptying station, which is connected to a line coming in from the ATM network for emptying the respective octet from the payload of the incoming cells and for reading this octet into the sorter;

a second code converter, which is connected in series with the sorter for converting incoming, destination-coded octets into unambiguously allocated octets of the N-ISDN network, which are to be transmitted in time multiplex fashion; and at least one logic with assigned memories for controlling the first and the second code converter and the sorter, said network adaptors being constructed free of blockages for receiving time-multiplexed octets from the lines coming in from the respective N-ISDN network or sending out time multiplexed octets on the lines going out to the respective N-ISDN network; said adaptors for filling the octets received into several cells in the payload; said adaptors for sending out and receiving cells on the lines going out to the ATM network and from the lines coming in from the ATM network respectively; said cells, as carriers of octets of an N-ISDN network, being specially marked; and said adaptors also for emptying the octets from the payloads of incoming cells.

2. An apparatus for transmitting digital data between any first party and a second party assigned to the first party, the parties belonging to a single, common or to two mutually independent N-ISDN networks, comprising:

said N-ISDN network or networks altogether having at least two ISDN nodes;

an ATM network having at least two ATM nodes;

at least two network adaptors, to which at least one ISDN node and at least one ATM node are connected over incoming and outgoing lines of a respectively assigned network norm;

wherein each network adaptor includes a sorter connected to a line coming in from the N-ISDN network for putting out each time-multiplexed, incoming octet on one of several outputs, which outputs in each case correspond to an allocated destination;

filling stations, connected in series with the outputs of the sorter for filling the sorted octets into the payload of respective cells, which are to be provided and are intended in each case for the particular destination, which corresponds to the respective output of the sorter, the octets in the payloads of the cells being arranged in a predetermined multiplex order;

an emptying station, which is connected to a line coming in from the ATM network, for emptying the respective octet from the payloads of the incoming cells;

a multiplex unit, which is connected in series with the emptying station, for sending out the incoming octets into the unambiguously allocated time slots of a line going out to the respective N-ISDN network; and at least one logic with assigned memories for controlling the sorter and the multiplex unit, said network adaptors being constructed free of blockages for receiving time-multiplexed octets from the lines coming in from the respective N-ISDN network or sending out time multiplexed octets on the lines going out to the respective N-ISDN network; said adaptors for filling the octets received into several cells in the payload; said adaptors for sending out and receiving cells on the lines going out to the ATM network and from the lines coming in from the ATM network respectively; said cells, as carriers of octets of an N-ISDN network, being specially marked; and said adaptors also for emptying the octets from the payloads of incoming cells.

3. The apparatus of claims 1 or 2, wherein a multiplexer is arranged between the filling stations and a single line going out to the ATM network.

4. The apparatus of claims 1 or 2, wherein each filling station is connected to an individually allocated line going out to the network.

* * * * *